United States Patent [19]
Craig

[11] 3,722,980
[45] Mar. 27, 1973

[54] MALLEABLE EXPOSURE SLIT FOR A CONTINUOUS STRIP PHOTOGRAPHIC PRINTER

[75] Inventor: Dwin Richardson Craig, Gaithersburg, Md.

[73] Assignee: Joseph F. Balac; Felix P. Tolosa, both of Vienna, Va.

[22] Filed: Feb. 16, 1972

[21] Appl. No.: 226,896

[52] U.S. Cl. ..........................355/83, 355/68, 355/71, 355/103
[51] Int. Cl. ..............................................G03b 27/76
[58] Field of Search............355/68, 71, 83, 103, 108

[56] References Cited

UNITED STATES PATENTS

| | | | |
|---|---|---|---|
| 3,523,727 | 8/1970 | Simon | 355/18 |
| 3,605,048 | 9/1971 | Sargent | 355/83 |

*Primary Examiner*—John M. Horan
*Attorney*—Elton H. Brown, Jr.

[57] ABSTRACT

A malleable exposure slit for continuous strip photographic printing to achieve automatic dodging as the print is being exposed. The film being printed is moved past a light source which passes through a slit transverse to the direction of movement of the film and exposes a positive material positioned against the film and moving therewith. The light passing through the film and positive material strikes equally spaced photoelectric cells positioned above the film and positive material to produce electrical energy in direct ratio to the light reaching the photo-electric cell. Each photo-electric cell is connected through an amplifier to an electro-mechanical piston with the piston arranged to underlie the film with the same transverse spacing as the photo-electric cells. A flexible membrane extends completely along one side of the slit to form one edge of the slit with the electro-mechanical piston engaged thereagainst. Movement of the pistons in a direction toward the slit pushes the flexible membrance into the slit to reduce the overall size of the slit at the point underlying the photoelectric cell controlling the specific piston. The flexible membrance is pressed into a harmonious curve to increase and decrease the area permitted for the light to pass in the slit in accordance with the light reaching the photoelectric cells.

5 Claims, 4 Drawing Figures

PATENTED MAR 27 1973 3,722,980

MALLEABLE EXPOSURE SLIT FOR A CONTINUOUS STRIP PHOTOGRAPHIC PRINTER

BACKGROUND OF THE INVENTION

Field of the Invention

The present invention relates to continuous strip photographic printers.

SUMMARY OF THE INVENTION

In a continuous strip photographic printer of the type having a transverse exposure slit one edge of the slit is modulated with a flexible membrane moved by a plurality of electro-mechanical pistons controlled by light passing through the slit to photo-electric cells positioned thereabove with one photo-electric cell being associated with each electro mechanical piston.

The primary object of the invention is to provide an automatic malleable exposure slit for a continuous strip photographic printer.

Other objects and advantages will become apparent in the following specification when considered in the light of the attached drawings.

DESCRIPTION OF THE PREFERRED EMBODIMENT

Figure 1:
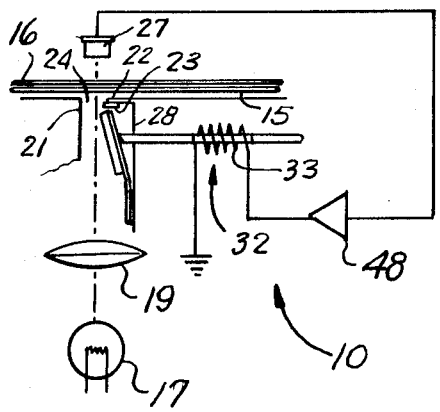
FIG. 1 is a semi-diagrammatic view of the invention illustrating the electric circuitry thereof.

Referring now to the drawings in detail, wherein like reference characters indicate like parts throughout the several figures, the reference numeral 10 indicates generally a malleable exposure slit system for a moveable strip photographic printer constructed in accordance with the invention.

The system 10 is used with a continuous strip photographic printer indicated generally at 11. The photographic printer 11 includes a roll 12 of negative film, a roll 13 of positive material generally paper, and a take up roll 14 for the negative material and positive paper. The film 15 and paper 16 are in engagement with each other and extend horizontally from the roll 12 to the roll 14. The rolls 12, 13, 14 are driven by a suitable apparatus (not shown) to move the film 15 and paper 16 onto the roll 14 at a pre-determined desired rate.

Figure 2:
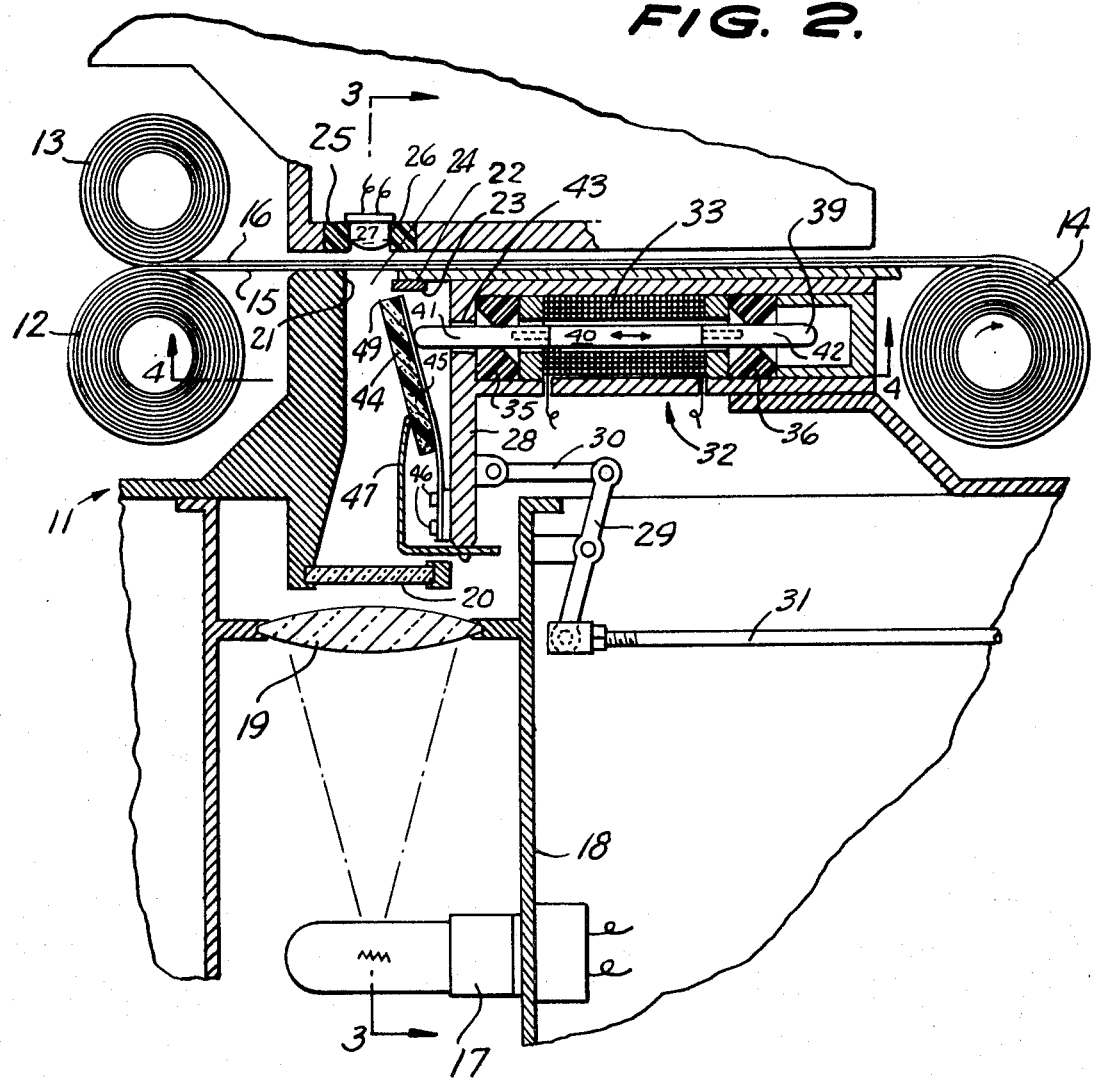
FIG. 2 is a side elevation of the invention shown partially sectioned for convenience of illustration.
Figure 3:
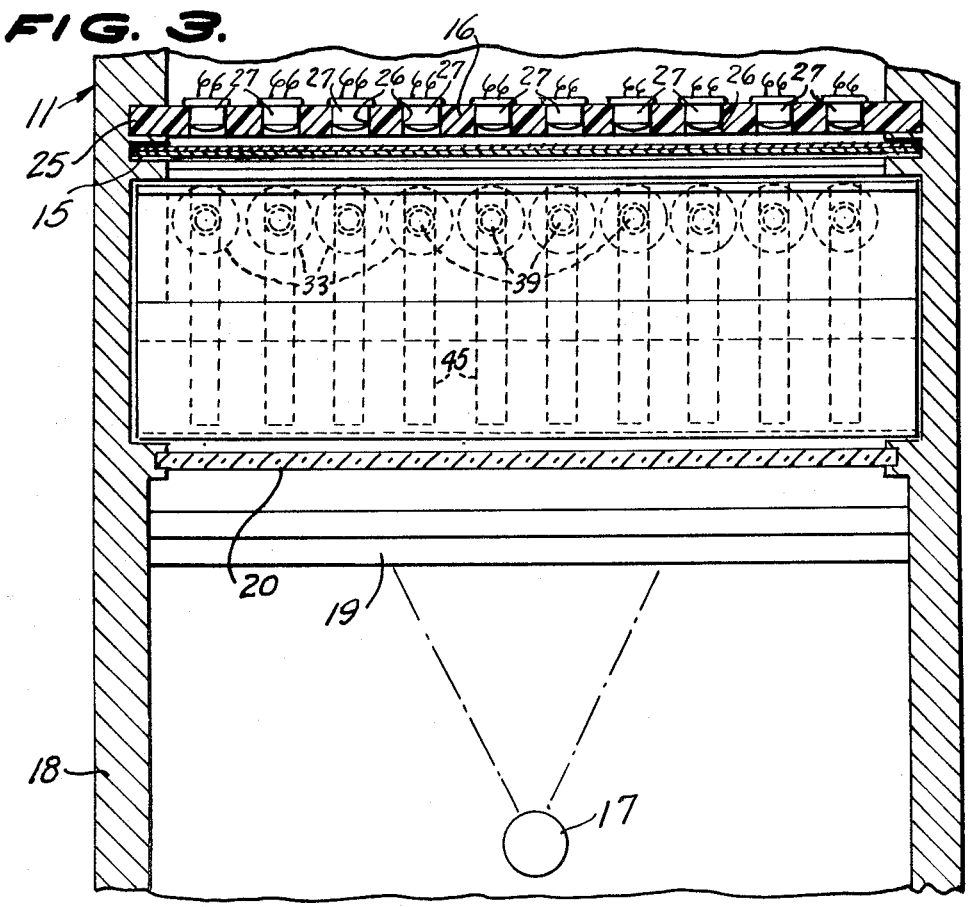
FIG. 3 is a vertical sectional view taken along the line 3—3 of FIG. 2, looking in the direction of the arrows, shown partially broken away for convenience of illustration.

A light 17 is supported in a housing 18 below the film 15 and a lense 19 is provided for spreading the light the desired amount. A window 20 overlies the lense 19 as can be seen in FIGS. 2 and 3. The lense 19 is an elongate lense rather than a circular lense.

A wall 21 is positioned above the light 17 and forms one side of a slit throughwhich the light 17 passes to reach the film 15 and positive paper 16.

A top wall 22 carries a member 23 thereon forming the opposite side of an aperture 24 throughwhich the light passes to reach the film 15.

A plastic bar 25 is mounted in the printer 11 overlying the aperture 24 as shown in FIGS. 2 and 3. A plurality of spaced parallel bores 26 extend downwardly through the bar 25 in equi-spaced relation with each bore 26 having a photoelectric cell 27 mounted therein so that light from the light 17 passing through the film 15 and positive paper 16 will impinge thereon.

A frame 28 is mounted below the top plate 22 for movement toward and away from the aperture 24. A bell crank 29 mounted on the housing 18 is connected to the frame 28 by a link 30 and is connected by a rod 31 to a hand controlled mechanism (not shown) for moving the frame 28 toward and away from the aperture 24.

A plurality of electro-mechanical pistons indicated generally at 32 are arranged in side by side relation transversely of the printer 11. Each of the electro-mechanical pistons 32 include an electro-magnetic coil 33 and an elongate piston rod 34 supported in a nylon bearing 35 at one end and a nylon bearing 36 at its opposite end. The rod 39 includes a metallic portion 40 and non-metallic opposite end portions 41, 42. A bore 43 extends through the frame 28 to permit the piston rod 39 to extend therethrough.

An elongate sponge rubber flexible membrane 44 extends transversely of the printer 11 and is supported on a plurality of flat metal spring members 45 secured at 46 to the frame 28. The spring members 45 are arranged in upright spaced apart parallel relation with one spring member 45 arranged to be contacted by one of the piston rods 39 so as to move the flexible membrane 44 toward the wall 21 when the coil 33 is magnetized to its fullest extent. An angle plate 47 is secured to the frame 28 and extends across the flexible membrane 44 to serve as a stop for the forward motion of the membrane 44 and as a member to mask the light on one side of the aperture 21.

Electric current from the photo-electric cell 27 flows into an amplifier 48 and from there to the coil 33 so as to energize the coil 33 to its fullest extent when the light falling on the photo-electric cell 27 is at its brightest.

Figure 4:
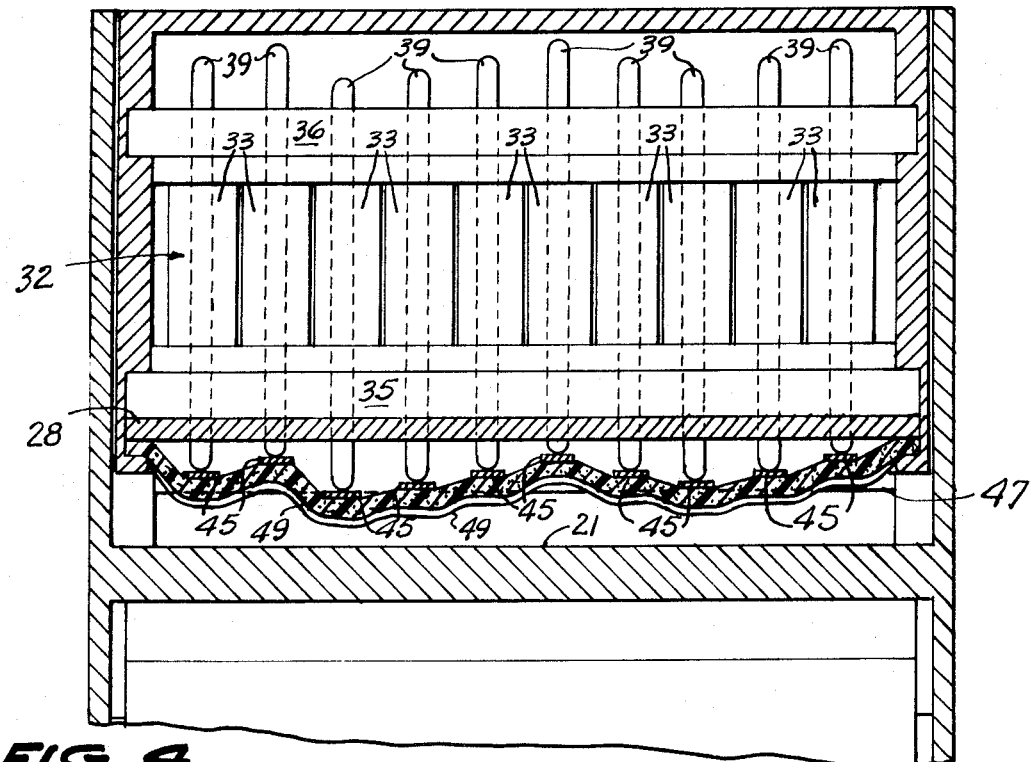
FIG. 4 is a horizontal sectional view taken along the line 4—4 of FIG. 2, looking in the direction of the arrows, shown partially broken away for convenience of illustration.

The nature of the sponge rubber membrane 44 is such that the top outer edge 49 thereof serves as a moveable edge to cooperate with the edge 21 to delineate the aperture 24. As can be seen in FIG. 4 the edge 49 assumes a harmonious curve as each of the piston rods 39 move a different amount against the separate springs 45 and the aperture 24 varies from end to end in width in accordance with the density of the recorded material on the film 15. The membrane 44 approaches the edge 21 as the brightest light passes to the photo-electric cell 27 and moves completely away from the edge 21 when the least transparent portions of the film 15 intercept light on its way to the photo-electric cell 27. The springs 45 move the membrane 44 toward the electro-mechanical piston 32 passing the piston rods 39 in a direction away from the membrane 44 when the current on the electro-magnet 33 is lessened.

While the printer has been disclosed with a single source of light it should be understood that multiple sources of light may be used with individual color controls for color printing when such is desired.

In the use and operation of the invention the system 10 exposes the positive material 16 in contact with the negative 15, while the two are transported at constant speed past an exposing slit aperture 24 which allows passage of light from a source of light 17.

An array of photo-cells 26 lined up across the width of the film 15 continuously monitor light passing through the slit 24 and through the negative 15, print material 16 sandwich. Accordingly each photo-cell 27 measures light received by the print material in a narrow band running the full length of the film 15 while measuring each photo-cell 27, sends a fed back signal via its amplifier 48 back to an electro-mechanical piston 32 which controls the width of a localized segment of the slit 24. To prevent (banding) all of the pistons 32 push against a common flexible membrane 44 which forms one edge of the slit 24 the other edge 21 is straight and fixed. In operation, width and shape of the slit 24 is automatically governed by density distribution in the negative.

The result of the automatic dodging of the system 10 is to produce a positive print in which details both in over-exposed and under-exposed portions are printed with much greater clarity.

Having thus described the preferred embodiment of the invention it should be understood that numerous structural modifications and adaptations may be resorted to without departing from the spirit of the invention.

What is claimed is:

1. A malleable exposure aperture slit for strip printers of the type including a source of light and means for moving a film and positive mateerial sandwich thereby to be exposed by the light comprising a flexible membrane supported in opposition to a wall in said printer to form an exposure slit extending completely across said sandwich for the light from said source of light, means controlled by the light passing through portions of said film and said positive material extending completely across said film and said positive material for moving corresponding portions of said flexible membrane toward said wall in direct ratio to the light passing through said corresponding portions of said film and said positive material.

2. A device as claimed in claim 1 wherein a plurality of photo-electric cells are included in said means controlled by the light and extend across the width of said film and said positive material for receiving light passing through spaced portions of said film and said positive material for controlling the spacing of said flexible membrane with respect to said wall.

3. A device as claimed in claim 2 wherein the means controlled by the light includes a plurality of electro-mechanical pistons individually controlled by a corresponding one of said photo-electric cells and individually presses a corresponding portion of said flexible membrane toward said wall.

4. A device as claimed in claim 3 wherein a plurality of spring bars supports said flexible membrane with each of said spring bars being engaged by one of said electro-mechancial pistons.

5. A device as claimed in claim 1 wherein said flexible membrane may be bodily adjusted toward said wall to vary the over all light passing through said aperture slit.

* * * * *